United States Patent
Dzeko et al.

(10) Patent No.: US 7,529,770 B2
(45) Date of Patent: May 5, 2009

(54) METHOD FOR PROTECTING A PROPRIETARY FILE

(75) Inventors: Mario Dzeko, Bielefeld (DE); Jens Maukisch, Hiddenhausen (DE); Sebastian Uhl, Herford (DE)

(73) Assignee: Arvato Digital Services GmbH (DE)

( * ) Notice: Subject to any disclaimer, the term of this patent is extended or adjusted under 35 U.S.C. 154(b) by 139 days.

(21) Appl. No.: 10/584,011

(22) PCT Filed: Dec. 15, 2004

(86) PCT No.: PCT/DE2004/002743

§ 371 (c)(1), (2), (4) Date: Jun. 21, 2006

(87) PCT Pub. No.: WO2005/062152

PCT Pub. Date: Jul. 7, 2005

(65) Prior Publication Data

US 2007/0168330 A1  Jul. 19, 2007

(30) Foreign Application Priority Data

Dec. 23, 2003  (DE) ................ 103 60 921

(51) Int. Cl.
  *G06F 7/00* (2006.01)
(52) U.S. Cl. .................. 707/104.1; 707/2; 707/3; 707/8; 707/10; 707/203; 705/51; 713/193; 713/194
(58) Field of Classification Search .......... 707/2, 707/3, 8, 10, 104, 203, 104.1; 705/51; 713/193, 713/194
See application file for complete search history.

(56) References Cited

U.S. PATENT DOCUMENTS

| 2002/0049760 | A1 | 4/2002 | Scott et al. |
| 2002/0184505 | A1* | 12/2002 | Mihcak et al. .............. 713/180 |
| 2003/0061287 | A1 | 3/2003 | Yu et al. |
| 2003/0233455 | A1 | 12/2003 | Leber et al. |

OTHER PUBLICATIONS

"Trusted Computing, Peer-To-Peer Distribution, and the Economics of Pirated Entertainment." Stuart E Schechter, Rachel A. Greenstadt, and Michael D Smith (May 29, 2003).*

"Incentives Build Robustness in Bit Torrent" Bram Cohen (May 22, 2003).*

"Handbook of Applied Cryptography" Alfred J Menezes, Paul C. van Oorschot and Scott A. Vanstone (Aug. 1997).*

"P2P Systems Based on Distributed Hash Table" Ming Xie Computer Science, University of Ottawa Sep. 26, 2003.*

(Continued)

*Primary Examiner*—Etienne P LeRoux
*Assistant Examiner*—Bruce A Witzenburg
(74) *Attorney, Agent, or Firm*—Robert C. Haldiman; Husch Blackwell Sanders LLP

(57) ABSTRACT

A file containing proprietary content can be protected against unauthorized duplication via file sharing between remote computers connected to an Internet swapping service. To this end, the content to be protected is searched on the Internet, at least the hash ID of each data record offered as a search hit is stored, this hash ID is linked to substitute content data, and queries of remote computers for the file to be protected are responded to by offering the modified data record.

17 Claims, 2 Drawing Sheets

OTHER PUBLICATIONS

Chord: A Scalable Peer-to-peer Lookup Service for Internet Applications Ion Stoica, Robert Morris, David Karger, M. Frans Kaashoek, Hari Balakrishnany MIT Laboratory for Computer Science (Aug. 2001).*

International Search Report for PCT/DE2004/002743 filed Dec. 15, 2004.

Schechter Trusted Computing, Peer-To-Peer Distribution, and the Economics of Pirated Entertainment May 29, 2003 Annual Workshop on Economics and Information Security XP002299690.

Sorkin, A.R.: "Software Bullet is Sought to Kill Musical Piracy" New York Times, New York, NY US May 4, 2003, Seiten 1-3 XP002299692, Absatz '0002!; Absatz '0005!.

"Overpeer spreads fake files through P2P networks" Jul. 9, 2002; XP002327498 Gelfunden im Internet; URL:http://web.archive.org/web/20020709113 823/http://ww.afterdawn.com/news/a.

Saaf R: "Written Testimony for the Oversight Hearing on Piracy of Intellectual Property on Peer-To-Peer Networks" Sep. 26, 2002; XP002299691 das ganze dokument.

* cited by examiner

METHOD FOR PROTECTING A PROPRIETARY FILE

CROSS-REFERENCE TO RELATED APPLICATIONS

This application claims priority from international application PCT/DE2004/002743 filed Dec. 15, 2004 and DE10360921.0 filed Dec. 23, 2003.

STATEMENT REGARDING FEDERALLY SPONSORED RESEARCH

Not Applicable.

APPENDIX

Not Applicable.

BACKGROUND OF THE INVENTION

Field of the Invention

The invention concerns a method for protecting a file with proprietary content against unauthorized copying by file sharing by other people's computers which are pooled to form an internet file sharing site and which make the file available in the form of randomly stored data records, each of which includes part of the proprietary content and also metadata which inter alia include at least one hash ID and, e.g., the title.

Considerable economic damage is caused to the owners of rights in particular to music and film works as well as games, due to unauthorized copying of the electronic versions of these works. A large proportion of unauthorized copying takes place by means of internet file sharing sites which work by the peer-to-peer (P2P) method. The commonest are central P2P file sharing sites in which on (central) servers are stored lists of contents available for exchange and the IP addresses of the computers subscribing to the file sharing sites, from which these contents can be downloaded. Upon a search inquiry, a subscribing computer receives from the answering server(s) a list with the IP addresses of those other subscribing computers which have stored a file with the desired content and are providing it for sharing. The searching computer then sets up connections to the providing computers and downloads the file with the desired content directly from the providing computers. In the case of decentralized P2P file sharing sites, upon search inquiries the subscribing computers also assume the role of the server for the searching computer and either answer that the file with the desired content is ready for downloading or, if not, pass on the search inquiry to other subscribing computers which if necessary in turn pass on until the file with the desired content is found and the searching computer can download it from the subscribing computer concerned.

As a rule, the files provided for sharing are stored on several subscribing computers, this being in the form of individual data records, each of which includes a portion of the content and metadata which include at least one hash ID generated by the known hash method. The searching subscribing computer then downloads, from the subscribing computers providing the desired file and forming a group, the corresponding randomly stored data records and reassembles them into a file with the desired content again.

It is known that at least some owners of rights are trying to make this kind of unauthorized copying of their original files with proprietary contents difficult by participating in the relevant file sharing sites as providers, this being with files which apparently have the desired, proprietary content, but in actual fact contain only noise, parts of the title or the like. Although these unusable files, because they cannot be recognized as such with the aid of their metadata, broadcast themselves in the same way as the original files on the subscribing computers logged on to the file sharing site concerned, and are entered in the lists of the file sharing site servers, only the time needed for unauthorized copying of the original file can be prolonged by this so-called flooding method, because the user of the searching computer which, after downloading a file including at least one unusable data record, recognizes this file as generally unusable, will start a new search and sooner or later obtain the desired original file from other file sharing site computers.

SUMMARY OF THE INVENTION

It is the object of the invention to provide a method of the kind indicated hereinbefore, which offers improved protection of files against unauthorized copying by a P2P method.

This object is achieved with a generic method according to the invention by the following steps:

1.1 searching for the content to be protected on the internet 1.2 saving at least the hash ID of each data record provided as a hit by at least one other person's computer 1.3 generating a data record which is modified from the data record provided and which includes at least the saved hash ID and replacement content data linked to the saved hash ID.

1.4 answering inquiries from other people's computers about the file to be protected, by providing the modified data record.

DETAILED DESCRIPTION

The above-mentioned other people's computers can be both file sharing site servers and, particularly in the case of the decentralised P2P method, computers subscribing to the internet file sharing site concerned. Accordingly, provision of the modified data record as mentioned in step 1.4 above may be confined to the information that the requested file or part of it is ready for downloading from one's own computer, or provision may include release of downloading of the modified data record.

If the user of the other person's computer visually or acoustically tracks downloading of the file sought and requested by him, he will establish that he is receiving an unusable file instead of the desired file and so repeat the process or start a new search, If the user of the computer does not track downloading, in his place the file sharing program of his computer will recognize, at the latest on completion of downloading, that the downloaded file includes at least one data record which has been modified from the original data record and so download the file again, or at least the data record concerned, or search for another (file sharing site) computer which will provide at least the data record concerned. Because the modified data record, without being recognizable as such at the outset, is available from many other computers subscribing to the file sharing site under supposedly the correct hash ID, there is a high probability that the searching and requesting computer will again download the modified data record, recognize it as modified, download it again or search, etc. After a certain time the user of this computer will break off the search for the original file.

Unlike the known flooding method of which the effectiveness, at least with certain file sharing programs, is limited by the fact that in the further search the user of the other person's computer can suppress the IP addresses of computers from which his computer has downloaded at least one unusable data record, with the method according to the invention the other person's computer constantly attempts again to download the original file again as soon as he has established that the previously downloaded file includes at least one data record which has been modified from the original data record.

The above-mentioned step 1.1 of the method according to the invention can appropriately be carried out in the following partial steps:

2.1 entering at least one search term identifying the file to be protected, in a local database of one's own computer 2.2 determining, entering and saving IP addresses of at least some of the other people's computers in the local database of one's own computer 2.3 setting up a connection of one's own computer to the internet and starting the search by scanning for the search term on the other people's computers.

The search term mentioned in step 2.1 may be in particular the title or part of the title of the proprietary content of the file, the interpreter, the author or a combination thereof. The determination and entry of IP addresses particularly of file sharing site servers mentioned in step 2.2 can be done manually, but in particular automatically using a suitable known search engine, with the aim of obtaining one or more lists of IP addresses from other people's computers subscribing to one or more file sharing sites.

One's own computer can then provide the modified data record belonging to the file to be protected, for downloading by the other people's computers designated by the saved IP addresses if the other person's computer concerned is a file sharing site server for inclusion in its list or, if the other person's computer is a subscribing computer, as a reply to its search inquiry about the file to be protected, which can then be followed by actual downloading of the (modified) data record.

Appropriately, the hash ID of each data record provided by another person's computer as a hit is compared with the saved hash IDs, and hits for which the result of comparison is positive are not further processed into a modified data record, to avoid redundancy.

Defensive measures by the file sharing site can be rendered ineffective by regularly altering the IP address of one's own computer, to prevent the other people's computers from skipping this IP address after unsuccessful downloading of a data record from one's own computer.

Inquiries by other people's computers about the file to be protected, or alternatively just retrievals of the modified data record, can be logged, this being in anonymous form, in the event that this is necessary for reasons of data protection. The log can be processed under any classification aspects, that is, not only for every protected file, but also, if the method is performed by a third party on behalf of several owners of rights, according to owner of rights who as a rule has an interest in the protection of more than one file with proprietary content against unauthorized copying.

Furthermore, the method can be designed such that searching for the content to be protected is done only up to a predetermined expiry date, because in many cases, e.g. when the proprietary content is a current pop song, the interest in unauthorized copying of a file is limited to a distinct length of time.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The sequence of the method according to the invention is shown as an example in the drawings. They show.

Figure 1:
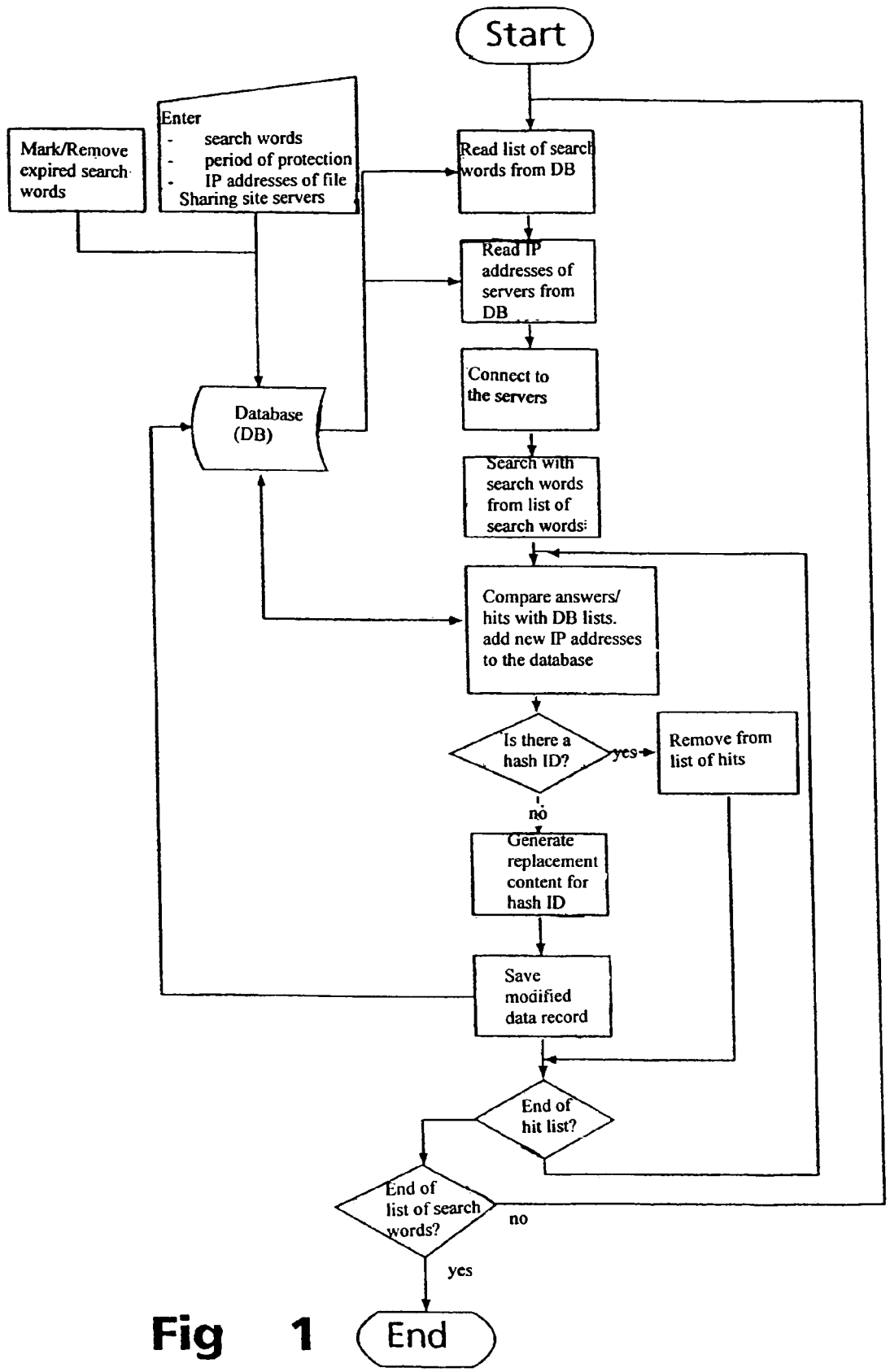
FIG. 1 is a flow chart of the search for files with proprietary contents provided by a file sharing site, and subsequent generation of a modified data record for each answer/hit.
Figure 2:
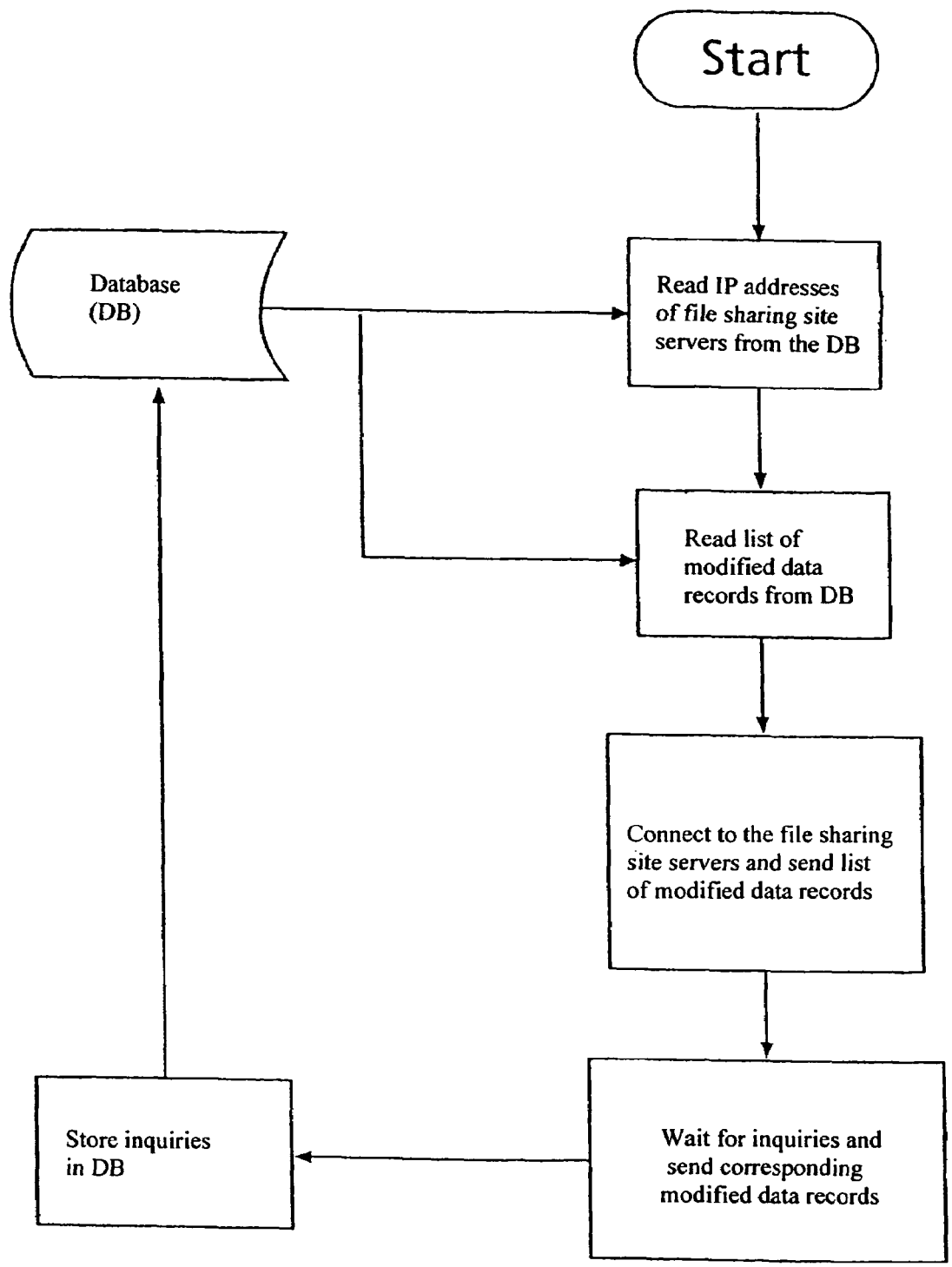
FIG. 2 is a flow chart of provision of the modified data record.

What is claimed is:

1. A method for protecting a file with proprietary content against unauthorized copying in response to inquiries by file sharing by other people's computers which are pooled to form an internet file sharing site and which make the file to be protected available in randomly stored data records, each of which includes part of the proprietary content and metadata which includes at least one hash ID comprising the following steps:

searching for the file to be protected on the internet saving at least the hash ID of each data record provided as a hit by at least one other person's computer generating a data record which is modified from the data record provided and which includes at least the saved hash ID and replacement content data linked to the saved hash ID answering the inquiries from other people's computers about the file to be protected, by providing the modified data record.

2. The method according to claim 1, wherein said searching step further comprises:

entering at least one search term identifying the file to be protected, in a local database of one's own computer determining, entering and saving IP addresses of at least one of the other people's computers in the local database of one's own computer setting up a connection of one's own computer to the internet and starting the search by scanning for the search term on the other people's computers.

3. The method according to claim 2, characterized in that one's own computer provides the modified data record belonging to the file to be protected, for downloading by the other people's computers designated by the saved IP addresses.

4. The method according to claim 1, characterized in that the hash ID of each data record provided by said other person's computer as a hit is compared with the saved hash IDs, and hits for which a result of the comparison is positive are not further processed into a modified data record.

5. The method according to claim 1, characterized in that an IP address of one's own computer is altered.

6. The method according to claim 1, characterized in that inquiries by other people's computers about the file to be protected are logged in anonymous form.

7. The method according to claim 1, characterized in that searching for the file to be protected is done only up to a predetermined expiry date.

8. The method of claim 1 wherein said hash ID with modified content is not recognized by an inquiring, by/of the other person's computer as having modified content without an inspection of actual content.

9. The method of claim 1 wherein an inquiring, by/of the other person's computer, if modified content with said hash ID is detected, a computer executing said answering step searches for downloading said hash ID at least one additional time without human user intervention.

10. The method of claim 2 further comprising providing said modified data record for downloading for said other people's computers designated by said saved IP address.

11. The method of claim 1 wherein said other person's computers are at least one computer subscribing to a distributed file sharing network.

12. The method of claim 5 wherein said alteration is repeated regularly.

13. The method of claim 1 wherein said generating step further comprises replacing the data record provided with said modified data record.

14. The method of claim 1 wherein said generating step further comprises rerouting the inquiries from other people's computers to said hash ID linked to said modified data record.

15. The method of claim 1 wherein said generating step further comprises both replacing the data record provided with said modified data record and rerouting the inquiries by other people's computers to said hash ID linked to said modified data record.

16. The method of claim 1 wherein an inquiry from the other person's computer does not recognize said modified content in said hash ID with modified content without an inspection of said modified content.

17. The method of claim 1 wherein if an inquiry from the other person's computer does recognize said modified content, the other person's computer searches for said hash ID at least one additional time without human user intervention.

* * * * *